United States Patent [19]

Berkowitz

[11] Patent Number: 4,872,697

[45] Date of Patent: Oct. 10, 1989

[54] ADAPTOR HANDLE

[76] Inventor: Gerard Berkowitz, 33 Highbury Street, Prospect, Australia

[21] Appl. No.: 265,484

[22] Filed: Nov. 1, 1988

[51] Int. Cl.⁴ .............................................. B62B 3/00
[52] U.S. Cl. .............................. 280/304.5; 16/114 R; 269/228
[58] Field of Search ......... 269/228; 292/66, DIG. 49; 16/40, 41, 114 R; 24/490, 514; 280/47.37 R, 289 R, 289 H, 47.31, 655, 304.5

[56] References Cited

U.S. PATENT DOCUMENTS

| | | | |
|---|---|---|---|
| 2,816,775 | 12/1957 | Costello | 280/289 H |
| 3,336,048 | 8/1967 | Papucki | 280/289 H |
| 3,503,276 | 3/1970 | Vigot | 280/47.37 R |
| 4,056,268 | 11/1977 | Connor et al. | 280/289 R |
| 4,708,357 | 11/1987 | Soderbaum | 280/289 H |

Primary Examiner—Charles A. Marmor
Assistant Examiner—Richard Camby
Attorney, Agent, or Firm—Stetina and Brunda

[57] ABSTRACT

An adapter handle for use on wheeled vehicles having two spaced-apart handles for application of propulsion forces and steering formed by an elongate arm extensible between the spaced-apart handles of the wheeled vehicle which includes a clamp adjacent each end thereof to enable the adaptor handle to be rapidly coupled onto the spaced-apart handles and a single hand grip extending substantially from the center of the arm. The clamps are formed as over-center latches having plural contact shoes and shoe spacers which allow the adaptor handle to be used on wheeled vehicles having differing sized handle grips. Additionally, one or more auxiliary hooks are provided to enable storage of desired items upon the adaptor handle during use.

9 Claims, 1 Drawing Sheet

U.S. Patent
Oct. 10, 1989
4,872,697
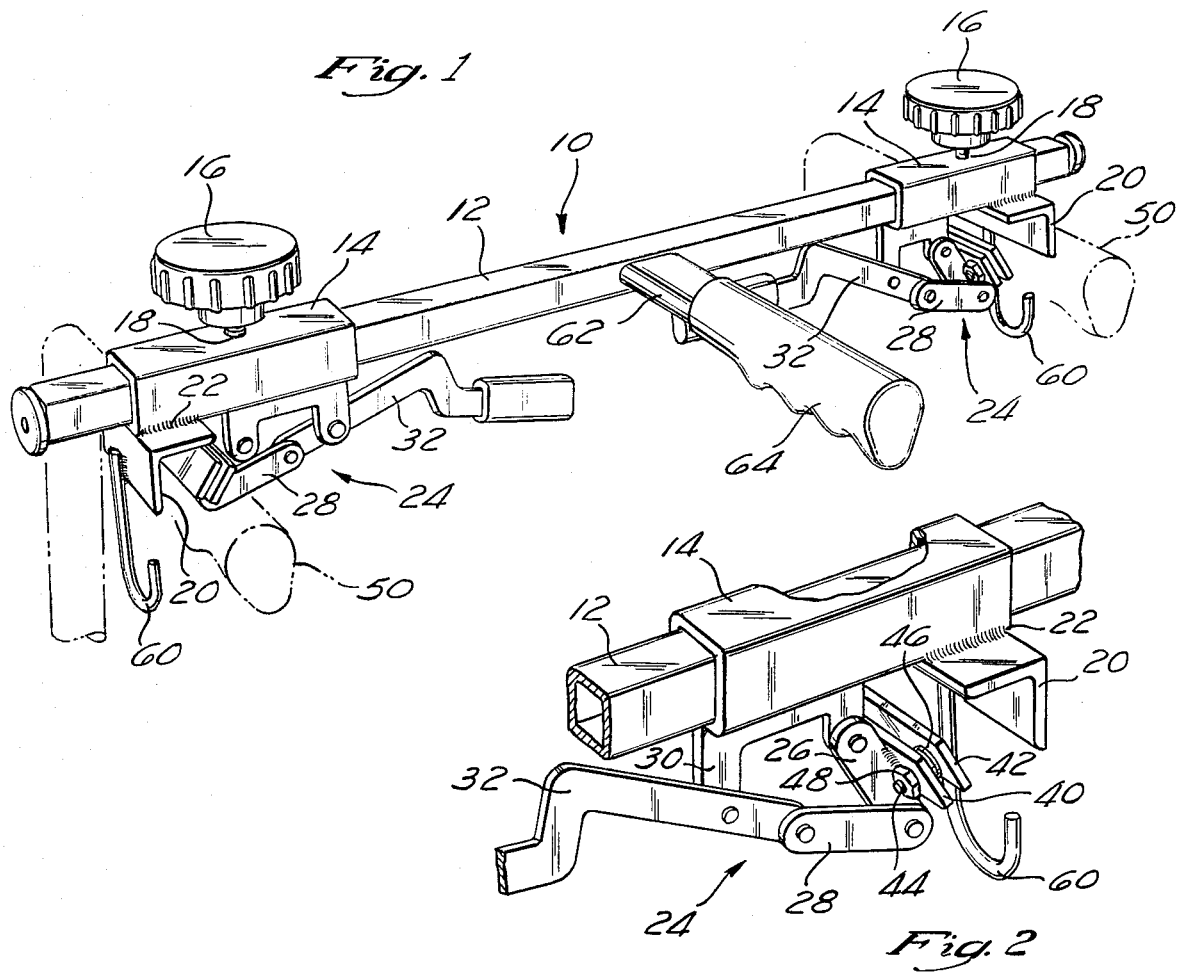
Fig. 1
Fig. 2
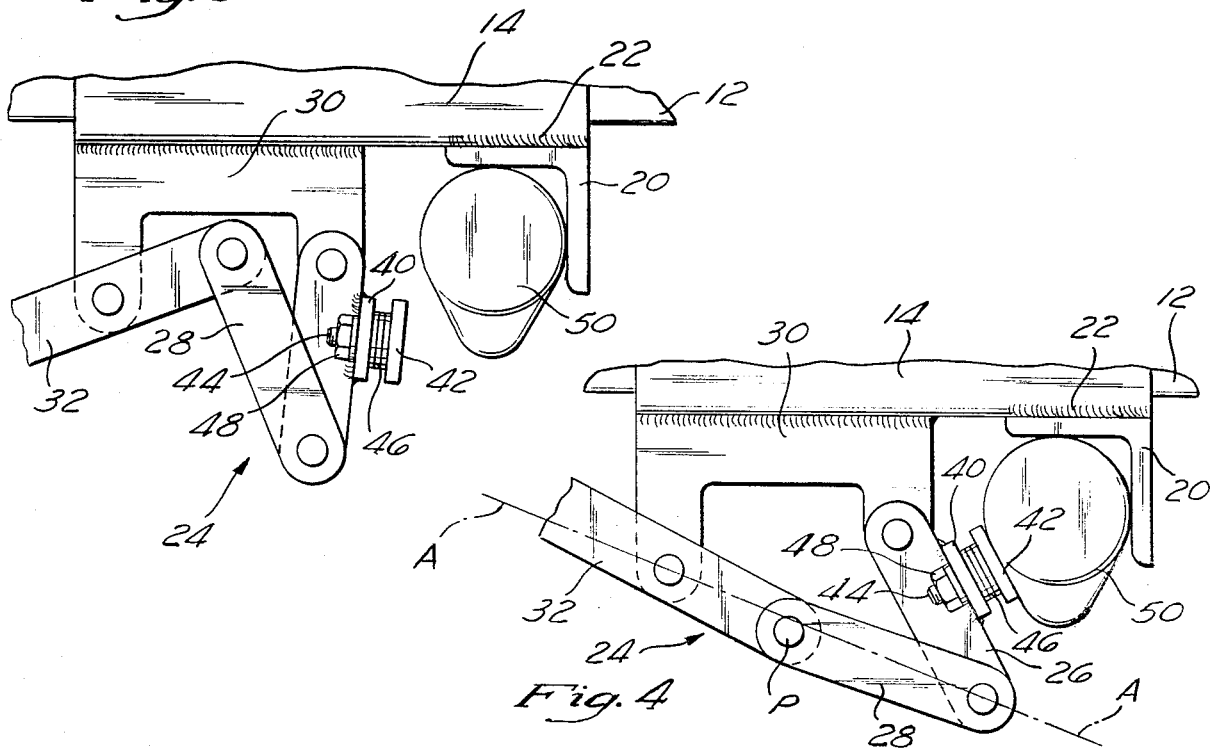
Fig. 3
Fig. 4

ADAPTOR HANDLE

BACKGROUND OF THE INVENTION

The present invention relates generally to an adaptor handle for wheeled vehicles and more particularly to wheeled vehicles of the type propelled by hand, such as wheelchairs.

Wheeled vehicles of the type to be considered with the present invention include wheelchairs, perambulators or baby carriages, supermarket trolleys, shopping carts, and the like, but the invention is not restricted to application to these devices and may be applied to general devices of the type discussed below. The type of wheeled vehicle particularly suited for the present invention comprises a wheeled vehicle having two spaced-apart handles extending from the vehicle adapted to enable the vehicle to be pushed along utilizing the handles to apply propulsion.

A problem exists, however, when a person has only one free hand to propel such a wheeled vehicle. In such instances, pushing on only one handle of the wheeled vehicle makes the vehicle very difficult to propel and particularly difficult to steer in confined areas, such as supermarket aisles and crowded streets where considerable damage could be caused by inadvertent mis-steering.

In recognizing the inherent deficiencies associated in the art, an adaptor handle was developed which extends between the pair of handles of a vehicle and allows a central hand grip to be utilized to readily propel and steer the vehicle with only one hand. This particular adaptor handle is disclosed and claimed in U.S. Pat. No. 4,708,357, issued on Nov. 24, 1987 to Mavis Soderbaum, which Letters Patent has been assigned to the subject inventor. The Soderbaum adaptor handle, although comprising a substantial improvement in the art, has proven difficult to readily accommodate the differing size of handle grips utilized on conventional wheeled vehicle and wheelchair devices. As such there exists a need in the art for an improved adaptor handle which may be rapidly mounted upon a wheeled vehicle and further accommodates the multitude of differing sized handle grips utilized in conventional wheeled vehicles.

SUMMARY OF THE PRESENT INVENTION

The present invention specifically addresses and alleviates the above-referenced deficiencies associated in the prior art by providing an adaptor handle for use on wheeled vehicles having two spaced apart handles for application of propulsion forces and steering which is characterized by use of an elongate arm extensible between the spaced-apart handles of the wheeled vehicle. The elongate arm includes clamp means adjacent each end thereof to enable the adaptor handle to be rapidly coupled onto the spaced-apart handles as well as a single grip extending substantially from the center of the arm. The clamp means are preferably formed as quick connect/disconnect over-center latches having plural contact shoes and shoe spacers which allow the adaptor handle to be used on wheeled vehicles having differing sized handles and handle grips. Additionally one or more auxiliary hooks are provided to enable storage of desired items upon the adaptor handle in a convenient manner.

The plural contact shoes are specifically designed to distribute the clamping force exerted by the adaptor handle over an enlarged surface area of the handle grips of the wheeled vehicle to prevent marring or permanent damage of the handle grips during use. Further the plural shoe spacers are specifically adapted to be rapidly inserted or removed from the over-center latches to rapidly accommodate differing sized handle grips for the wheeled vehicle.

To install the adaptor handle of the present invention, both of the over-center latches are initially disposed in their open configuration and positioned about the handle grip of the wheeled vehicle. Depending upon the particular size of the handle grip on the wheeled vehicle, one or more shoe spacers may be removed from the over-center latches, and subsequently the over-center latches may be disposed in their closed or locked orientation thereby securing the adaptor handle to the wheeled vehicle. Subsequently, the elongate bar extending between the pair of latches may be reciprocated to a desired position wherein its central handle is disposed approximately midway between the latches and the elongate bar may then be rapidly locked in its desired position by way of a pair of tightening knobs. When desired to remove the adaptor handle from the wheeled vehicle, the over-center latches may be rapidly disposed in their open orientation whereby the entire adaptor handle may be rapidly removed from the wheeled vehicle and stored for reuse.

DESCRIPTION OF THE DRAWINGS

These as well as other features of the present invention will become more apparent upon reference to the drawings wherein:

FIG. 1 comprises a perspective view of the adaptor handle of the present invention disposed upon a pair of handles of a wheeled vehicle;

FIG. 2 is a partial perspective view of one of the over-center latches, support carriage, and elongate bar utilized in the adaptor handle of the present invention;

FIG. 3 is an elevational view of the latching mechanism disposed in an open orientation; and FIG. 4 is an elevational view of the over-center latch disposed in a closed orientation.

DETAILED DESCRIPTION OF THE PREFERRED EMBODIMENT

Referring to the figures, the improved adaptor handle of the present invention, designated generally by the numeral 10, is depicted, which for purposes of illustration and not be way of limitation, is shown mounted to the handles or handle grips 50 of a conventional wheelchair. The adaptor handle 10 is composed generally of an elongate arm 12 which is preferably formed having a rectangular cross-sectional configuration which slidingly mounts a pair of carriages 14 thereupon. As shown, the carriages 14 are preferably formed from an elongate tubular member having an internal opening formed in a complementary configuration to the cross-sectional configuration of the arm 12 such that the carriages 14 may reciprocate axially along the length of the arm 12. Each of the carriages 14 include a hand wheel or knob 16 having a threaded shaft 18 extending axially outward from the lower surface thereof which is received within a threaded aperture formed in the upper surface of each carriage 14. As will be recognized, by manually tightening, i.e. threading, the hand wheel 16 in a clockwise direction, as viewed in FIG. 1, the threaded shafts 18 contact the upper surface of the arm 12 causing the carriages 14 to be locked in a desired axial position upon the arm 12.

The lower surface of the carriages 14 is additionally provided with a right angle elongate plate 20 which is rigidly connected thereto as by way of fillet welds 22. An over-center latch, designated generally by the numeral 24, is additionally provided on the under surface of each carriage 14. As shown, the over-center latch 24 comprises a pair of linkages 26 and 28 which are pivotally interconnected at one end thereof. The opposite end of linkage 26 is additionally pivotally connected to a bracket 30 rigidly mounted to the lower surface of the carriage 14. The opposite end of the linkage 28 is pivotally connected to a latch handle 32 which is additionally pivotally connected to the bracket 30. As will be recognized, by pivotal movement of the handle 32, the linkage 26 moves away from and toward the right angle member 20 from an open orientation, depicted in FIG. 3, to a closed orientation, depicted in FIG. 4. Additionally, as will be recognized, when disposed in the closed orientation depicted in FIG. 4, an over-center latching mechanism is provided since the pivot point P lies below the axis A—A formed between the linkages 26 and 28 and handle 32, as shown in FIG. 4.

In the preferred embodiment, the linkages 26 include a first contact shoe or plate 40 which is rigidly attached thereto. A pair of apertures is provided in the shoe 40 spaced on opposite sides of the linkage 26, each of which receives a threaded shank 44 extending perpendicularly outward from a second contact plate or shoe 42. As shown, both of the shoes 40 and 42 are formed as elongate flat planar members preferably having the same dimensions. One or more spacers 46 are disposed between the shoes 40 and 42 which in the preferred embodiment comprise flat washers having a central aperture sized to extend about the threaded shaft 44 of the shoe 42. A threaded fastener or nut 48 is provided on the end of each of the threaded shaft 44 to assemble the shoe 42 and spacers 46 upon the shoe 40.

As will be recognized, by selective addition or removal of one or more of the plural spacers 46 from the threaded shafts 44, the spacing of the shoe 42 from the right angle member 20 may be varied and thereby accommodate differing sized handle grips 50 of the wheeled vehicle. Further, in those instances where an extremely large diameter handle grip 50 is provided upon the wheeled vehicle, the entire outer shoe 42 and spacers 46 may be removed whereby the inner shoe 40 contacts the handle grip 50. Further, it will be recognized that due to the shoes 42 and 44 comprising flat elongate plate members, the compressive or gripping force applied to the handle grip 50 by the shoes 42 or 44 is distributed over a relatively large surface area thereby insuring that the handle grip 50 is not marred or permanently damaged during use of the present invention.

Referring again to FIGS. 1 and 2, it will be seen that in the preferred embodiment, a substantially J-shaped hook 60 is additionally provided on the exterior surface of each of the right angle members 20 and depends downwardly therefrom. As will be recognized, such hooks 60 provide an auxiliary support surface which allows shopping bags, handbags, and/or tote bags to be attached thereto when the handle adaptor 10 is utilized. Additionally, as shown in FIG. 1, a handle 62 preferably having a hand grip 64 is rigidly attached to the central portion of the arm 12 and extends perpendicularly outward therefrom.

With the structure defined, the installation and use of the adaptor handle 10 of the present invention may be described. Initially, the adaptor handle 10 must be fitted to the particular wheeled vehicle to which it is desired to be applied. This initial fitting procedure is accommodated by disposing the latches 24 into their open configuration depicted in FIG. 3 by rotating the latch handle 32 in a counterclockwise direction when viewed in FIG. 2. Additionally, both of the hand wheels or knobs 16 may be loosened to allow both carriages 14 to be freely reciprocal along the length of the arm 12. Subsequently, each of the carriages 14 may be disposed above the handles 50 of the wheeled vehicle whereby the inner surfaces of the right angle members tangentially contact the exterior of each of the handles or handle grips 50 of the wheeled vehicle. The desired number of spacers 46 may then be inserted or removed from the threaded shafts 44 of the shoes 42 and subsequently the shoes 42 and spacer or spacers 46 may be rigidly attached to the shoes 40 by way of tightening of the plural fasteners 48. In certain circumstances, i.e. when the handle 50 of the wheeled vehicle has an extremely wide diameter, the shoes 42 and spacers 46 as well as fasteners 48 may be completely removed from the shoe 40.

Subsequently, each of the handles 32 of the latches 24 may be pivoted in a clockwise direction, as viewed in FIG. 2, causing the latches 24 to be disposed in their closed orientation, as depicted in FIG. 4, whereby the shoes 42 contact the exterior surface of the handles 50 and tightly wedge the handle grips 50 between the shoes 42 and the right angle members 20. As will be recognized, when disposed in this position, the latches 24 are in an over-center position which deters any inadvertent release of the adaptor handle 10 from the handle grips 50. The arm 12 may then be rapidly axially reciprocated relative the carriages 14 such that the handle 62 and handle grip 64 are disposed centrally between the carriages 14. The hand wheels 16 may then be tightened to lock the carriages 14 along the length of the arm 12.

As will be recognized, with the adaptor handle 10 positioned upon the wheeled vehicle, propulsion and steering of the wheeled vehicle may be rapidly facilitated by a single hand being placed upon the handle grip 64. Further, auxiliary packages, handbags, or the like may be rapidly carried by the adaptor handle 10 merely by placing the same over the plural hooks 60 depending downwardly from the carriages 14.

When it is desired to remove the adaptor handle 10 from the wheeled vehicle, the latch handles 32 may be rapidly articulated to dispose the latches 24 in their open orientation and the entire adaptor handle 10 may be removed therefrom for storage. Subsequently, the adaptor handle 10 may be affixed to the same wheeled vehicle merely by repositioning and articulating the latches 24 to a closed orientation or alternatively be installed upon a differing wheeled vehicle in the manner previously described.

Throughout this specification various material configurations have been defined herein, however those skilled in the art will recognize that various modifications can be made to the same without departing from the spirit of the invention and such modifications are clearly contemplated herein.

What is claimed is:

1. An adaptor handle for wheeled vehicles and the like having a pair of rearwardly extending spaced-apart handles for application of propulsion forces and steering comprising:

an elongate arm member sized to extend across the pair of spaced-apart handles of the vehicle;

an over-center latch mounted adjacent opposite ends of said arm member for releasably clamping said arm member to said pair of handles of the vehicle;

a hand grip centrally mounted to said arm member and extending rearwardly therefrom adapted to be grasped in the hand of a user; and means carried on said over-center latch for allowing said over-center latch to accommodate differing sized handles of the vehicles, said allowing means comprising:

a first plate member affixed to said over-center latch;

a second plate member removably mounted to said first plate member; and plural spacers removably mounted between said first and second plate members.

2. The adaptor handle of claim 1 wherein said second plate member includes a pair of threaded shanks extending generally perpendicularly outward therefrom which are insertible into said first plate member.

3. The adaptor handle of claim 2 wherein said plural spacers comprise plural washers disposed on said pair of threaded shanks.

4. The adaptor handle of claim 3 wherein said over-center latch is coupled to a carriage reciprocally mounted upon said arm member.

5. The adaptor handle of claim 4 further comprising means for releasably locking said carriage at a desired axial position along the length of said arm member.

6. The adaptor handle of claim 5 wherein said releasably locking means comprises a threaded hand wheel extensible through said carriage to contact said arm member.

7. The adaptor handle of claim 6 wherein said arm member and said carriage are formed having complementary cross-sectional configurations.

8. The adaptor handle of claim 7 wherein said second plate member and said first plate member are formed having a generally planar exterior surface sized to distribute the clamping force of said over-center latch throughout a sufficient area of said pair of handles to avoid any permanent deformation of said pair of handles.

·9. The adaptor handle of claim 8 further comprising at least one hook member depending from said carriage for hanging articles therefrom.

* * * * *